United States Patent
Hou et al.

(10) Patent No.: US 10,815,778 B1
(45) Date of Patent: Oct. 27, 2020

(54) METHOD FOR OBTAINING FORMATION PARAMETERS OF GAS HYDRATE RESERVOIR THROUGH WELL TESTING INTERPRETATION

(71) Applicant: China University of Petroleum (East China), Qingdao (CN)

(72) Inventors: Jian Hou, Qingdao (CN); Ermeng Zhao, Qingdao (CN); Yongge Liu, Qingdao (CN); Yueliang Liu, Qingdao (CN); Bei Wei, Qingdao (CN); Yunkai Ji, Qingdao (CN); Yajie Bai, Qingdao (CN); Nu Lu, Qingdao (CN); Huiyu Wang, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 16/700,239

(22) Filed: Dec. 2, 2019

(51) Int. Cl.
  *E21B 47/06* (2012.01)
  *E21B 49/08* (2006.01)
  (Continued)

(52) U.S. Cl.
  CPC ............ *E21B 49/087* (2013.01); *E21B 21/08* (2013.01); *E21B 21/14* (2013.01); *E21B 43/24* (2013.01); *E21B 49/003* (2013.01); *G06F 17/11* (2013.01)

(58) Field of Classification Search
  CPC ... E21B 47/06; E21B 2049/085; E21B 49/087
  See application file for complete search history.

(56) References Cited

U.S. PATENT DOCUMENTS

| 8,688,616 B2 * | 4/2014 | Fernandez Martinez ................... G06N 7/005 706/52 |
| 2014/0222749 A1 * | 8/2014 | Fernandez Martinez ................... G06N 7/005 706/52 |

(Continued)

OTHER PUBLICATIONS

Hou et al., "Pressure-transient bahavior in class III hydraft reservoirs", (2019) Energy 170 pp. 391-402. https://doi.org/10.1016/j.energy.2018.12.178, 0360-5442 Copyright 2018 Elsevier Ltd.

*Primary Examiner* — Catherine Loikith
(74) *Attorney, Agent, or Firm* — Volpe and Koenig, P.C.

(57) ABSTRACT

The disclosure discloses a method for obtaining formation parameters of a gas hydrate reservoir through well testing interpretation, which comprises: (1) establishing a physical model for well testing interpretation of the gas hydrate reservoir according to multiphase flow, hydrate dissociation, secondary hydrate formation and heat transfer exhibited in the well testing process of the gas hydrate reservoir; (2) establishing a mathematical model for well testing interpretation of the gas hydrate reservoir; (3) conducting spatial discretization and temporal discretization on the mathematical model, and adopting a finite volume method to obtain a numerical solution of bottom-hole pressure; (4) calculating a bottom-hole pressure variation curve and a production rate variation curve in the well testing process of the hydrate reservoir, and drawing theoretical curves of bottom-hole pressure difference and pressure difference derivative; and (5) matching a measured pressure curve with the theoretical curve to obtain the relevant formation parameters.

6 Claims, 4 Drawing Sheets

(51) Int. Cl.
*E21B 49/00* (2006.01)
*G06F 17/11* (2006.01)
*E21B 21/08* (2006.01)
*E21B 21/14* (2006.01)
*E21B 43/24* (2006.01)

(56) References Cited

U.S. PATENT DOCUMENTS

2016/0341850 A1* 11/2016 Lin .................... G06F 30/20
2017/0139065 A1* 5/2017 Gentilhomme ........ G01V 1/282
2018/0196905 A1* 7/2018 Wu ..................... G06F 30/23

* cited by examiner

METHOD FOR OBTAINING FORMATION PARAMETERS OF GAS HYDRATE RESERVOIR THROUGH WELL TESTING INTERPRETATION

FIELD OF THE DISCLOSURE

The disclosure relates to a method for obtaining formation parameters of a gas hydrate reservoir through well testing interpretation, and belongs to the technical field of well testing.

BACKGROUND OF THE DISCLOSURE

Gas hydrates are ice-like crystalline compounds formed by water molecules and methane molecules in high-pressure and low-temperature environments, which are mainly distributed in continental permafrost or deep-sea sediments. According to conservative estimates, the organic carbon content in global gas hydrates is twice that of fossil energy (coal, oil and gas). Gas hydrates have attracted extensive attention due to their wide distribution, large reserves, high energy density, cleanliness and high-efficiency, and are regarded as the most promising alternative energy to replace conventional oil and gas in the future.

Up to now, Canada, the United States, Japan and China have successively carried out the pilot production of gas hydrate reservoirs, which indicates another solid step towards commercial exploitation of gas hydrates. Before the exploitation of gas hydrate reservoirs, it is necessary to carry out well testing on production wells, and through the interpretation and analysis of well testing data, to understand the production performance of wells and obtain reasonable formation parameters. On this basis, production plan design and long-term production performance prediction are conducted to obtain the optimal recovery and economic benefits. After formal exploitation of hydrate reservoirs, it is also necessary to carry out well testing on production wells and obtain formation parameters in the production process through well testing interpretation, so as to monitor the production performance of hydrate reservoirs and judge the connectivity between wells. Therefore, well testing interpretation plays an important role in the whole exploitation process of gas hydrate reservoirs.

In recent years, well testing interpretation models and analysis methods for conventional oil and gas reservoirs have been gradually improved. Well testing models include a homogeneous reservoir model, a composite reservoir model, a multi-fractured horizontal well model, a stimulated reservoir volume-fractured horizontal well model etc. Well testing analysis methods include interference well testing, pulse well testing, multiphase flow well testing, etc. For gas hydrate reservoirs, because of the complex thermal-chemical-multiphase flow mechanism in the well testing process, the transient bottom-hole pressure in the well testing process is more complex. The existing well testing interpretation methods for conventional oil and gas reservoirs are no longer applicable. At present, there is no well testing interpretation method for gas hydrate reservoirs, which greatly restricts the interpretation of well testing data of gas hydrate reservoirs.

SUMMARY OF THE DISCLOSURE

The disclosure establishes an unstable well testing interpretation method for gas hydrate reservoirs on the basis of comprehensively considering the effects of hydrate dissociation, secondary hydrate formation, multiphase flow and heat transfer in the well testing process of gas hydrate reservoirs. The method of the disclosure has high accuracy and strong practicability, and can provide theoretical basis and technical means for well testing data interpretation of hydrate reservoirs in the field. The method of the disclosure realizes the acquisition of formation parameters of gas hydrate reservoirs under flow conditions through well testing interpretation.

The disclosure relates to a method for obtaining formation parameters of a gas hydrate reservoir through well testing interpretation, which includes the following steps of:

(1) establishing a physical model for well testing interpretation of the gas hydrate reservoir according to the characteristics of multiphase flow, hydrate dissociation, secondary hydrate formation and heat transfer exhibited in the well testing process of the gas hydrate reservoir;

(2) establishing a mathematical model for well testing interpretation of the gas hydrate reservoir according to the physical model for well testing interpretation of the gas hydrate reservoir established in step (1);

(3) conducting spatial discretization and temporal discretization on the mathematical model for well testing interpretation of the gas hydrate reservoir established in step (2), and adopting a finite volume method to solve the mathematical model, thus obtaining a numerical solution of bottom-hole pressure;

(4) inputting relevant basic parameters to simulate the pressure buildup well testing process of the hydrate reservoir, calculating a bottom-hole pressure variation curve and a production rate variation curve in the well testing process according to the numerical solution obtained in step (3), and drawing theoretical curves of bottom-hole pressure difference and pressure difference derivative in the shut-off period under a double logarithmic coordinate axis; and (5) by means of a particle swarm optimization algorithm, automatically matching measured curves of bottom-hole pressure difference and pressure difference derivative with the theoretical curves obtained in step (4), to finally obtain the relevant formation parameters when the minimum value of an objective function is realized, including the permeability of the gas hydrate reservoir, permeability reduction exponent, initial formation pressure and hydrate reservoir boundaries.

The disclosure has the beneficial effects and advantages that:

(1) the established unstable well testing interpretation method for the gas hydrate reservoir is simple in process, and has strong practicability. The well testing interpretation method realizes the acquisition of the formation parameters of the gas hydrate reservoir under flow conditions through well testing interpretation, and can provide theoretical basis and technical means for well testing interpretation of the hydrate reservoir in the field;

(2) the established mathematical model for well testing interpretation of the gas hydrate reservoir comprehensively considers the mechanisms of hydrate dissociation, secondary hydrate formation, multiphase flow and heat transfer in the well testing process, and can truly reflect the dynamic characteristics of bottom-hole pressure change in the well testing process of the gas hydrate reservoir; and (3) the unstable well testing interpretation method for the gas hydrate reservoir established by the disclosure greatly improves the accuracy of formation parameters, and the obtained formation parameters can better characterize the characteristics of the hydrate reservoir under flow conditions, can be directly used for formulating a gas hydrate reservoir exploitation scheme and predicting production performance in the field.

In the figures: 1. Overburden layer; 2. Hydrate layer; 3. Underburden layer; 4. Production well; 5. Perforation.

DETAILED DESCRIPTION OF THE EMBODIMENTS

The present disclosure will be further described below with reference to the drawings and embodiments, but the scope of implementation of the present disclosure is not limited.

Figure 1:
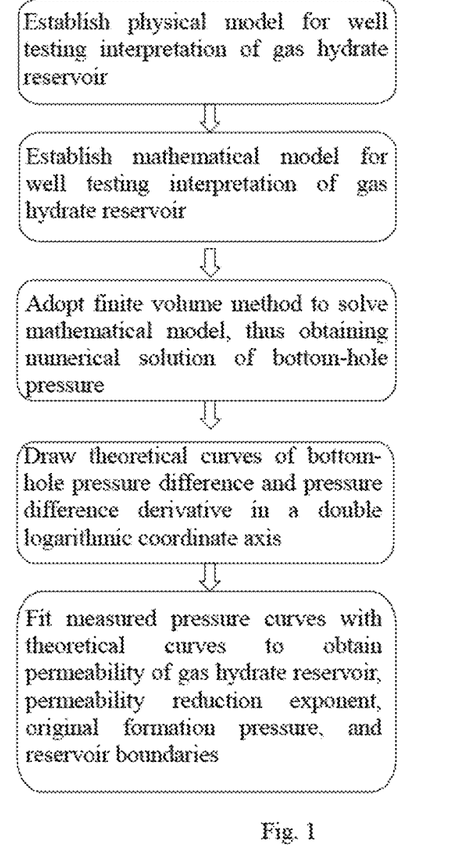
FIG. 1 is a flow chart of a method for obtaining formation parameters of a gas hydrate reservoir through well testing interpretation.
Figure 2:
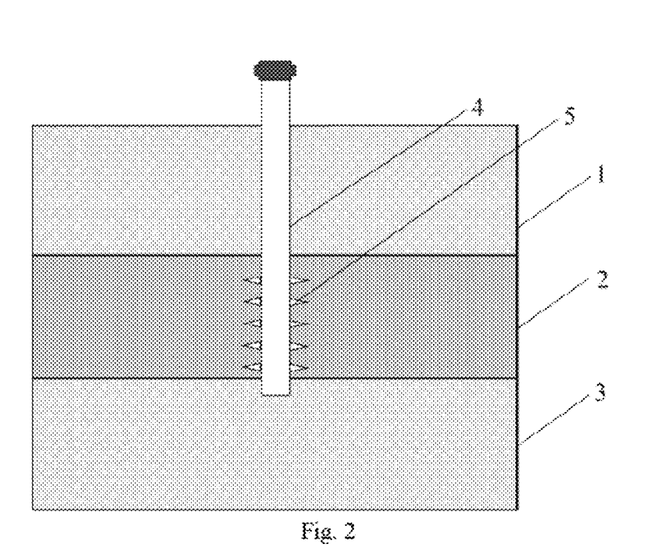
FIG. 2 is a schematic diagram of a physical model for well testing interpretation of a gas hydrate reservoir.

As shown in FIG. 1, a method for obtaining formation parameters of a gas hydrate reservoir through well testing interpretation provided by the disclosure includes the following steps of:

(1) a physical model for well testing interpretation of the gas hydrate reservoir is established according to the characteristics of multiphase flow, hydrate dissociation, secondary hydrate formation and heat transfer exhibited in the well testing process of the gas hydrate reservoir, as shown in FIG. 2;

wherein in step (1), the physical model includes: the gas hydrate reservoir composed of a overburden layer 1, a hydrate layer 2 and a underburden layer 3; the overburden layer and the underburden layer are composed of impermeable dry rock, and the hydrate layer is composed of dry rock, a water phase, a gas phase, a hydrate phase and an ice phase; a production well 4 is located in the center of the hydrate reservoir on the plane; perforations 5 are located in the hydrate layer; the assumption conditions of the physical model at least include: the influence of in-situ stress on the well testing process is ignored; flow in the gas phase and the water phase follows the Darcy's law; the heat conduction process follows the Fourier's law; hydrate dissociation and secondary formation are kinetic reactions; the influence of formation water salinity is ignored; and the pressure buildup well testing is adopted in the process of well testing, i.e. production is carried out for a period of time and then the well is shut off for a period of time.

(2) a mathematical model for well testing interpretation of the gas hydrate reservoir is established according to the physical model for well testing interpretation of the gas hydrate reservoir established in step (1);

wherein the specific process for establishing the mathematical model for well testing interpretation of the gas hydrate reservoir in step (2) is as follows:

(1) the gas hydrate reservoir is a four-phase and three-component system, the four phases are water phase, gas phase, hydrate phase and ice phase, and the three components are methane, water and hydrate, wherein the methane component exists in the water phase and the gas phase, the water component exists in the water phase, the gas phase and the ice phase, and the hydrate component only exists in the hydrate phase; firstly, the mass conservation equation of each component in the hydrate layer is determined, and the mass conservation equation of the methane component is:

$$\frac{\partial}{\partial t}\left(\sum_{\beta=A,G}\phi S_\beta \rho_\beta X_\beta^m\right) + \nabla \cdot \left(\sum_{\beta=A,G} X_\beta^m \vec{v}_\beta\right) = \sum_{\beta=A,G} X_\beta^m q_\beta + \dot{n} M_m \quad (1)$$

wherein the subscript $\beta$ represents the phase, the superscript m represents the methane component in the hydrate layer, $\phi$ is the porosity of the hydrate layer, $S_A$ and $S_G$ are the water phase saturation and the gas phase saturation in the hydrate layer respectively, $\rho_A$ and $\rho_G$ are the water phase density and the gas phase density respectively, $X_A^m$、$X_G^m$ are the mass fraction of the methane component in the water phase and the mass fraction of the methane component in the gas phase of the hydrate layer respectively, t is time, $\vec{v}_A$、$\vec{v}_G$ are the mass flow velocity of the water phase and the mass flow velocity of the gas phase in the hydrate layer respectively, $q_A$ and $q_G$ are the production rate of the water phase and the production rate of the gas phase in the production well respectively, $\dot{n}$ is the hydrate dissociation/secondary formation rate, $M_m$ is the molar mass of methane;

the mass conservation equation of the water component is:

$$\frac{\partial}{\partial t}\left(\sum_{\beta=A,G,I}\phi S_\beta \rho_\beta X_\beta^w\right) + \nabla \cdot \left(\sum_{\beta=A,G} X_\beta^w \vec{v}_\beta\right) = \sum_{\beta=A,G} X_\beta^w q_\beta + n_H \dot{n} M_w \quad (2)$$

wherein the superscript w represents the water component of the hydrate layer, $S_I$ is the ice phase saturation in the hydrate layer, $\rho_I$ is the ice phase density, $X_A^w$、$X_G^w$、$X_I^w$ are the mass fraction of the water component in the water phase, the mass fraction of the water component in the gas phase and the mass fraction of the water component in the ice phase of the hydrate layer respectively, $n_H$ is the hydration number, and $M_w$ is the molar mass of water;

the mass conservation equation of the hydrate component is:

$$\frac{\partial(\phi S_H \rho_H)}{\partial t} = -\dot{n} M_h \quad (3)$$

wherein h represents the hydrate component in the hydrate layer, $S_H$ is the hydrate phase saturation in the hydrate layer, $\rho_H$ is the hydrate phase density, and $M_h$ is the molar mass of hydrate;

the mass flow velocities of the water phase and the gas phase $\vec{v}_A$ and $\vec{v}_G$ are calculated respectively by the following formulas:

$$\vec{v}_A = -k\frac{k_{rA}\rho_A}{\mu_A}(\nabla p_A - \rho_A \vec{g}) \quad (4)$$

$$\vec{v}_G = -k\frac{k_{rG}\rho_G}{\mu_G}(\nabla p_G - \rho_G \vec{g}) \quad (5)$$

wherein k is the permeability of the hydrate layer, $k_{rA}$ and $k_{rG}$ are the relative permeability of the water phase and the relative permeability of the gas phase in the hydrate layer respectively, $\mu_A$ and $\mu_G$ are the viscosity of the water phase and the viscosity of the gas phase respectively, $p_A$ and $p_G$ are the water phase pressure and the gas phase pressure in the hydrate layer respectively, and $\vec{g}$ is the gravitational acceleration;

the calculation formula of the porosity of the hydrate layer varying with the hydrate saturation is as follows:

$$\phi = \phi_0(1-S_H) \quad (6)$$

wherein $\phi_0$ is the initial porosity when there is no hydrate at all in the hydrate layer;

the calculation formula of the permeability of the hydrate layer varying with the porosity is as follows:

$$k = k_0\left(\frac{\phi}{\phi_0}\right)^\varepsilon \left(\frac{1-\phi_0}{1-\phi}\right)^2 \quad (7)$$

wherein $k_0$ is the absolute permeability when there is no hydrate at all in the hydrate layer, and $\varepsilon$ is the permeability reduction exponent;

the calculation formula of the hydrate dissociation/secondary formation rate $\dot{n}$ is:

$$\dot{n} = K_d \exp\left(-\frac{\Delta E_a}{RT}\right)A_{HS}[f_{eq} - f_G] \quad (8)$$

wherein $K_d$ is the inherent reaction rate constant of hydrate, $\Delta E_a$ is activation energy, R is the universal gas constant, T is the temperature of the hydrate layer, $A_{HS}$ is the reaction surface area of hydrate particles in unit volume porous medium, $f_{eq}$ is the corresponding fugacity under the hydrate phase equilibrium condition, and $f_G$ is the corresponding gas phase fugacity under the current condition;

(2) taking into account the heat conduction in the overburden layer, the underburden layer and the hydrate layer, the heat convection caused by gas phase and water phase flow in the hydrate layer and the influence of hydrate chemical reaction heat in the hydrate layer during the well testing of the gas hydrate reservoir, the energy conservation equation is determined as follows:

$$\frac{\partial}{\partial t}\left[(1-\phi)\rho_R U_R + \sum_{\beta=A,G,H,I}(\phi S_\beta \rho_\beta U_\beta)\right] - \nabla \cdot (\lambda_{eff}\nabla T) + \nabla \cdot \left(\sum_{\beta=A,G}H_\beta \vec{v}_\beta\right) = \left(\sum_{\beta=A,G}H_\beta q_\beta\right) + \dot{n}\Delta H_H^0 + \tilde{q}_{in}$$

wherein $U_R$、$U_A$、$U_G$、$U_H$、$U_I$ are the specific internal energy of the dry rock, the specific internal energy of the water phase, the specific internal energy of the gas phase, the specific internal energy of the hydrate phase and the specific internal energy of the ice phase respectively, $\rho_R$ is the density of the dry rock, $C_R$ is the specific heat capacity of dry rock, $\lambda_{eff}$ is the composite heat conductivity of the hydrate layer, $\lambda_{eff}=\phi(\lambda_A S_A+\lambda_G S_G)+(1-\phi_0)\lambda_R+(\phi_0-\phi)(S_H\lambda_H+S_I\lambda_I)$, $\lambda_A$, $\lambda_G$, $\lambda_H$ and $\lambda_I$ are the heat conductivity of the water phase, the heat conductivity of the gas phase, the heat conductivity of the hydrate phase and the heat conductivity of the ice phase in the hydrate layer respectively, $\lambda_R$ is the heat conductivity of the dry rock, $H_A$、$H_G$ are the specific enthalpy of the water phase and the specific enthalpy of the gas phase in the hydrate layer respectively, $\Delta H_H^0$ is the chemical reaction heat of hydrate dissociation/secondary formation, and $\tilde{q}_{in}$ is for unit time, the heat transfer amount per unit area passing through an interface between the overburden layer and the hydrate layer and an interface between the underburden layer and the hydrate layer;

according to the Vinsome and Westerveld (1980) semi-analytical model, the temperature distribution along any vertical position z at any time t in the overburden layer and the underburden layer is as follows:

$$\xi(t,z)=\xi_i+(\xi_f-\xi_i+az+bz^2)\exp(-z/d) \quad (10)$$

wherein z is the coordinate along the vertical direction, $\xi_i$ is the temperature at the interface between the overburden layer and the hydrate layer or the interface between the underburden layer and the hydrate layer at the initial time, $\xi_f$ is the temperature at the interface between the overburden layer and the hydrate layer or the interface between the underburden layer and the hydrate layer at any time, a and b are relevant matching parameters, and d is the penetration depth of heat conduction, and can be calculated by the following formula:

$$d = \frac{\sqrt{\kappa t}}{2} \quad (11)$$

wherein $\kappa$ is the thermal diffusion coefficient, $$\kappa = \frac{\lambda_R}{\rho_R C_R};$$

the matching parameters a and b can be calculated by the following formula:

$$a = \frac{\frac{\kappa \Delta t(\xi_f-\xi_i)}{d}+I^N-d^3\frac{\xi_f-\xi_N}{\kappa \Delta t}}{\kappa \Delta t + 3d^2}, \quad (12)$$

$$b = \frac{\xi_f-\xi_N}{2\kappa\Delta t}+\frac{a}{d}-\frac{\xi_f-\xi_i}{2d^2}$$

wherein $\Delta t$ is the iteration time step, $I^N$ is the intermediate variable of the previous iteration time step, $I^N[(\xi_f-\xi_i)d+ad^2+2bd^3]^N$, $\xi_N$ represents the temperature at the interface between the overburden layer and the hydrate layer or the interface between the underburden layer and the hydrate layer in the previous iteration time step;

according to Fourier's law, the calculation formula of $\tilde{q}_{in}$ is:

$$\tilde{q}_{in} = -\lambda_R \frac{d\xi}{dz}\bigg|_{z=0} = \lambda_R\left(\frac{\xi_f - \xi_i}{d} - a\right) \quad (13)$$

(3) the initial condition, the inner boundary condition and the outer boundary condition of the gas hydrate reservoir are determined, wherein the initial condition is:

$p(r,t=0)=p_0$ $T(r,t=0)=T_0$ $S_H(r,t=0)=S_{H0}$ $S_A(r,t=0)=S_{A0}$ \quad (14)

wherein p is the pressure of the hydrate layer, r is the coordinate along the radial direction, $p_0$ is the initial formation pressure of the hydrate layer, $T_0$ is the initial formation temperature of the hydrate layer, and $S_{H0}$ and $S_{A0}$ are the initial hydrate phase saturation in the hydrate layer and the initial water phase saturation in the hydrate layer respectively;

according to the pressure buildup well testing process, the internal boundary condition can be determined as follows:

$$p|_{r_w, t \leq t_p} = p_{wf} \quad (15)$$

$$q|_{r_w, t > t_p} = 0$$

wherein $r_w$ is the wellbore radius of the production well, $p_{wf}$ is the bottom-hole pressure of the production well, $t_p$ is the production time before shut-off of the production well, and q is the sum of the total production rate of the gas phase and the water phase in the production well;

the outer boundary is a closed boundary, and the outer boundary condition can be determined as follows:

$$\frac{\partial p}{\partial r}\bigg|_{r=r_e, t} = \frac{\partial T}{\partial r}\bigg|_{r=r_e, t} = 0 \quad (16)$$

wherein $r_e$ is the radius of the gas hydrate reservoir.

(3) spatial discretization and temporal discretization are conducted on the mathematical model for well testing interpretation of the gas hydrate reservoir established in step (2), and a finite volume method is adopted to solve the mathematical model, thus obtaining a numerical solution of bottom-hole pressure;

wherein the specific process for numerical solution of the mathematical model for well testing interpretation of the gas hydrate reservoir in step (3) is as follows:

(1) grid division is carried out on a gas hydrate reservoir in space, and discretization is carried out by backward difference in time;

(2) discretization is carried out on the mathematical model by adopting a finite volume method, wherein for any discrete grid unit i, the mass conservation equation of the methane component after discretization is as follows:

$$\left(\sum_{\beta=A,G} \phi S_\beta \rho_\beta X_\beta^m\right)_i^{n+1} - \left(\sum_{\beta=A,G} \phi S_\beta \rho_\beta X_\beta^m\right)_i^n - \quad (17)$$

-continued $$\frac{\Delta t}{V_i} \sum_j A_{ij}\left(\sum_{\beta=A,G} X_\beta^m \vec{v}_\beta\right)_{ij}^{n+1} - \Delta t\left(\sum_{\beta=A,G} X_\beta^m q_\beta + \dot{n} M_m\right)_i^{n+1} = 0$$

wherein i and j represent the i-th and j-th discrete unit grids, n represents the n-th iteration time step, $\Delta t$ is the iteration time step, $V_i$ is the volume of the i-th discrete unit grid, and $A_{ij}$ is the area of an interface between the i-th and j-th discrete unit grids;

for any discrete grid unit i, the mass conservation equation of the water component after discretization is:

$$\left(\sum_{\beta=A,G,I} \phi S_\beta \rho_\beta X_\beta^w\right)_i^{n+1} - \left(\sum_{\beta=A,G,I} \phi S_\beta \rho_\beta X_\beta^w\right)_i^n - \quad (18)$$

$$\frac{\Delta t}{V_i} \sum_j A_{ij}\left(\sum_{\beta=A,G} X_\beta^w \vec{v}_\beta\right)_{ij}^{n+1} - \Delta t\left(\sum_{\beta=A,G} X_\beta^w q_\beta + n_H \dot{n} M_w\right)_i^{n+1} = 0$$

for any discrete grid unit i, the mass conservation equation of the hydrate component after discretization is:

$$(\phi S_H \rho_H)_i^{n+1} - (\phi S_H \rho_H)_i^n + \Delta t M_h \dot{n}_i^{n+1} = 0 \quad (19)$$

for any discrete grid unit i, the energy conservation equation after discretization is:

$$\left[(1-\phi)\rho_R U_R + \sum_{\beta=A,G,H,G,I} (\phi S_\beta \rho_\beta U_\beta)\right]_i^{n+1} - \quad (20)$$

$$\left[(1-\phi)\rho_R U_R + \sum_{\beta=A,G,H,G,I} (\phi S_\beta \rho_\beta U_\beta)\right]_i^n -$$

$$\frac{\Delta t}{V_i} \sum_j A_{ij}\left(\sum_{\beta=A,G} H_\beta \vec{v}_\beta - \lambda_{eff} \nabla T\right)_{ij}^{n+1} -$$

$$\Delta t\left(\sum_{\beta=A,G} H_\beta q_\beta + \dot{n} \Delta H_H^0\right)_i^{n+1} = 0$$

for any discrete grid unit i, the initial condition after discretization is:

$p_i^{n+1} = p_0$ $T_i^{n+1} = T_0$ $(S_H)_i^{n+1} = S_{H0}$ $(S_A)_i^{n+1} = S_{A0}$ \quad (21)

the internal boundary condition after discretization is:

$$p_{wb}^{n+1}\big|_{t \leq t_p} = p_{wf} \quad (22)$$

$$\frac{2\pi \Delta z}{\ln(r_{ew}/r_w) - 1/2}\left[\left(\frac{k k_{rG} \rho_G}{\mu_G} + \frac{k k_{rA} \rho_A}{\mu_A}\right)(p_{wb} - p_{wf})\right]_{wb}^{n+1}\bigg|_{t > t_p} = 0$$

wherein the subscript wb represents a wellbore, $r_{ew}$ is the equivalent radius of the grid where the well is located, $p_{wb}$ is the pressure of the grid where the well is located, and $\Delta z$ is the thickness of the grid where the well is located;

the default boundary of the finite volume method is a closed boundary, so it is not necessary to solve the external boundary discretely;

(3) a matrix is constructed according to a nonlinear equation set consisting of the equations (17)-(22), and the iterative solution of the mathematical model is realized by using a conjugate gradient method, thus obtaining the numerical solution of the bottom-hole pressure during well testing of the gas hydrate reservoir.

Figure 3:
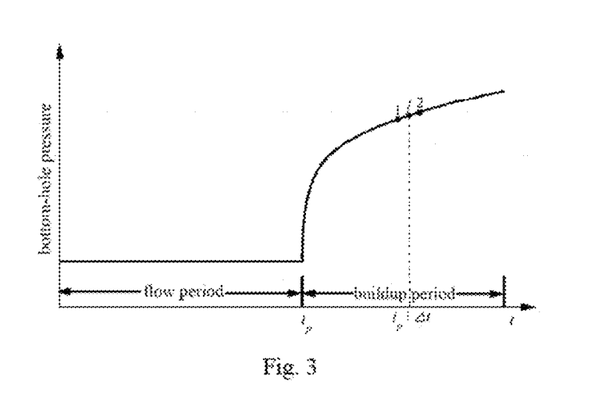
FIG. 3 is a schematic diagram of a bottom-hole pressure variation curve during well testing of a gas hydrate reservoir.
Figure 4:
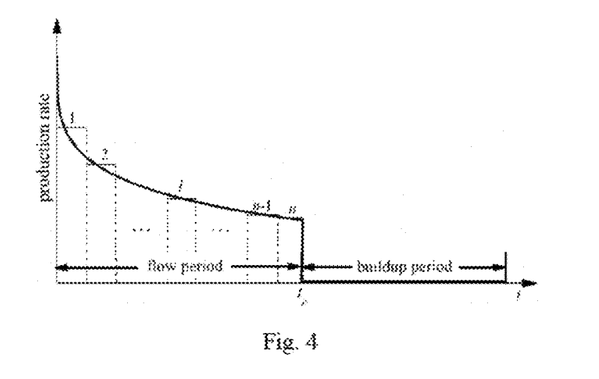
FIG. 4 is a schematic diagram of a production rate variation curve during well testing of a gas hydrate reservoir.
Figure 5:
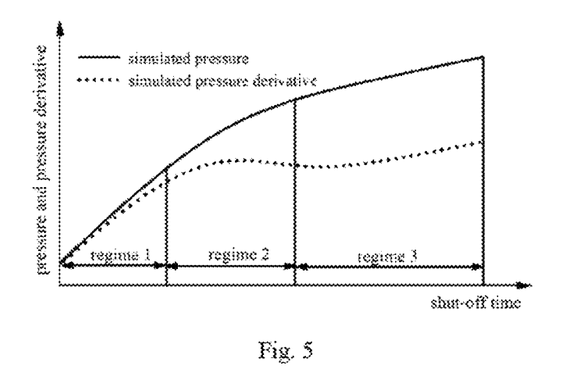
FIG. 5 is a schematic diagram of theoretical curves of bottom-hole pressure difference and pressure difference derivative.
Figure 6:
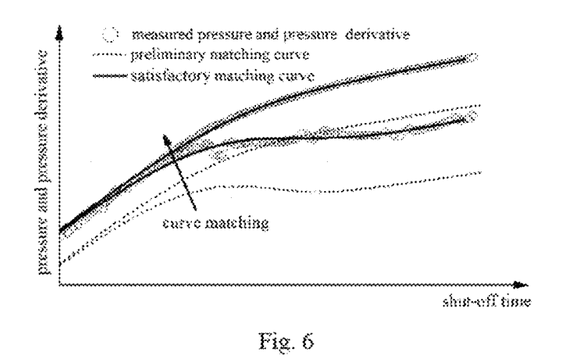
FIG. 6 is a schematic diagram of a process of matching measured pressure curves with theoretical curves.

(4) relevant basic parameters are input to simulate the pressure buildup well testing process of the hydrate reservoir, a bottom-hole pressure variation curve and a production rate variation curve in the well testing process are calculated according to the numerical solution obtained in step (3), and theoretical curves of bottom-hole pressure difference and pressure difference derivative in the shut-off phase are drawn under a double logarithmic coordinate axis; and wherein in step (4), the input basic parameters include: thickness of hydrate layer, boundaries of hydrate reservoir, initial porosity, initial absolute permeability, permeability reduction exponent, gas-water relative permeability curve, gas-water capillary pressure curve, initial water saturation, initial hydrate saturation, initial formation pressure, initial formation temperature, geothermal gradient, water phase viscosity, gas phase viscosity, hydrate phase density, hydration number, hydrate phase equilibrium curve, hydrate reaction rate constant, specific heat capacity of rock, specific heat capacity of water phase, specific heat capacity of hydrate phase, specific heat capacity of gas phase, heat conductivity of rock, heat conductivity of water phase, heat conductivity of hydrate phase, heat conductivity of gas phase, and bottom-hole flowing pressure in the production phase;

in step (4), the calculated bottom-hole pressure curve is shown in FIG. 3, as can be seen from the figure, the well testing process is divided into two phases, the first phase is to produce for a period of $t_p$ in a fixed bottom-hole pressure manner, the second phase is the shut-off phase, the bottom-hole pressure gradually recovers, the time at any time point l in the shut-off process is recorded as $t_p+\Delta t$, the calculated production rate change curve is shown in FIG. 4, as can be seen from the figure, the production rate in the production phase changes with time, the production rate in the shut-off phase is 0, and to calculate the pressure difference derivative, the production rate data in the production phase needs to be divided into n time periods;

in the theoretical curve of step (4), the calculation formula of the bottom-hole pressure difference is:

$$\Delta p(t_p+\Delta t)=p_{wf}(t_p+\Delta t)-p_{wf}(t_p) \qquad (23)$$

wherein $\Delta p(t_p+\Delta t)$ is the bottom-hole pressure difference at time $t_p+\Delta t$, $p_{wf}(t_p+\Delta t)$ is the bottom-hole pressure of the production well at time $t_p+\Delta t$, $p_{wf}(t_p)$ is the bottom-hole pressure of the production well at time $t_p$;

in the theoretical curve of step (4), the calculation method of the bottom-hole pressure difference derivative is as follows:

$$\Delta p'_l = \left(\frac{d\Delta p}{dX}\right)_l = \left[\left(\frac{\Delta p_1}{\Delta X_1}\right)\Delta X_2 + \left(\frac{\Delta p_2}{\Delta X_2}\right)\Delta X_1\right](\Delta X_1 + \Delta X_2) \qquad (24)$$

wherein the subscript l represents any l-th time node in the shut-off phase, the subscript 1 represents the time node before the l-th time node, and the subscript 2 represents the time node after the l-th time node, $\Delta p'_l$ is the derivative of bottom-hole pressure difference at the l-th time, $d\Delta p$ is the differentiation of $\Delta p$, $dX$ is the differentiation of X, $\Delta X_1$ and $\Delta X_2$ represent the variation of X at time 1 and time 2 respectively, $\Delta p_1$ and $\Delta p_2$ represent the bottom-hole pressure difference at time 1 and time 2 respectively;

in step (4), the production rate data in the production phase is artificially divided into it stages, as shown in FIG. 4, the expression of X is:

$$X = \frac{1}{q_n - q_{n-1}}\left[\sum_{l=1}^{n-1}(q_l - q_{l-1})\ln\sum_{s=l}^{n-1}(\Delta t_s + \Delta t)\right] + \ln(\Delta t) \qquad (25)$$

wherein the subscript s represents any s-th time node in the shut-off phase.

in step (4), in the double logarithmic coordinate axis, the theoretical curves of bottom-hole pressure difference and pressure difference derivative in the shut-off phase are shown in FIG. 5, in which the solid line is the pressure difference curve and the dotted line is the pressure difference derivative curve, and as can be seen from the figure, the pressure difference derivative curve shows different characteristics in different shut-off times and can be divided into different flow phases according to the characteristics exhibited in the pressure derivative curve;

(5) by means of a particle swarm optimization algorithm, measured curves of bottom-hole pressure difference and pressure difference derivative are automatically matched with the theoretical curves obtained in step (4), to finally obtain the relevant formation parameters when the minimum value of an objective function is realized, including the permeability of the gas hydrate reservoir, permeability reduction exponent, initial formation pressure and hydrate reservoir boundaries;

in step (5), the calculation formula of the objective function value in the matching process is:

$$G(\vec{x}) = \sum_{l=1}^{N}[\Delta p(t_p + \Delta t_l, \vec{x}) - \Delta p(t_p + \Delta t_l)]^2 + \sum_{l=1}^{N}[\Delta p'(t_p + \Delta t_l, \vec{x}) - \Delta p'(t_p + \Delta t_l)]^2 \qquad (26)$$

wherein $G(\vec{x})$ is the least square value, $\vec{x}$ is the relevant search variable, $\Delta p(t_p+\Delta t_l, \vec{x})$, and $\Delta p(t_p+\Delta t_l)$ represent the bottom-hole pressure difference value of the theoretical curve and the bottom-hole pressure difference value of the measured curve when searching along the direction $\vec{x}$ at time $t_p+\Delta t_l$ respectively, $\Delta p'(t_p+\Delta t_l, \vec{x})$, and $\Delta p'(t_p+\Delta t_l)$ represent the bottom-hole pressure difference derivative value of the theoretical curve and the bottom-hole pressure difference derivative value of the measured curve when searching along the direction $\vec{x}$ at time $t_p+\Delta t_l$ respectively, and N represents the total number of discrete time points on the curve;

the particle swarm optimization algorithm is adopted to search in a definition domain $(\vec{x}_{min}, \vec{x}_{max})$ of search variables, and the theoretical pressure difference and pressure difference derivative curves are calculated by changing relevant matching parameters, including the permeability of the gas hydrate reservoir, permeability reduction exponent, initial formation pressure and hydrate reservoir boundaries, so that the objective function value is minimized, and the finally obtained matching parameters are the formation parameters obtained through well testing interpretation;

the schematic diagram of the matching process is shown in FIG. 6, the measured pressure difference and pressure difference derivative curves are shown by circles in the figure, the pressure difference and pressure difference derivative curves calculated in the matching process are shown by dashed lines in the figure, the particle swarm optimization algorithm is used to continuously search in the definition domain of search variables, by changing relevant matching parameters, the objective function value is finally minimized, and the pressure difference and pressure difference derivative curves calculated at this moment are shown by solid lines in the figure, thus obtaining the relevant formation parameters.

The following are specific embodiments to further illustrate the contents of the present disclosure:

EMBODIMENT

Taking the well testing data of a production well from gas hydrate reservoir in the permafrost as an example, the well is a vertical well with a wellbore radius of 0.108 m. According to logging interpretation results, it can be seen that the depth range of the hydrate layer where the well is located is 1086-1103 m, the initial porosity of the hydrate layer is 0.415, the initial water saturation is 0.149, the initial hydrate saturation is 0.851, the well testing horizon is 1089.5-1090 m, the perforation interval is 0.5 m, the initial formation pressure is 11.568 MPa, the initial formation temperature is 13.9□, and the geothermal gradient is 3□/100 m.

Figure 7:
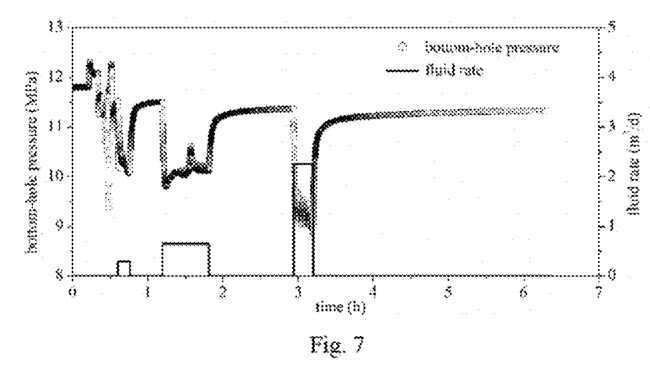
FIG. 7 shows a measured bottom-hole pressure curve and a production rate curve according to an embodiment.

The bottom-hole pressure and production rate data in the well testing process is shown in FIG. 7. The well testing process comprises three production phases and three shut-off phases. As can be seen from the figure, the bottom-hole pressure data in each production phase fluctuates, but the bottom-hole pressure data in each shut-off phase is smooth. Further, due to the long shut-off time in the third phase and the long duration in the third shut-off phase, the bottom-hole pressure data in this shut-off phase is finally selected, and the measured pressure difference and pressure difference derivative curves are drawn in the double logarithmic coordinate axis, as shown by dots in FIG. 8. From FIG. 8, two flow regimes of the well can be identified: a radial flow regime in a dissociated region and a hydrate reformation reflection regime in the wellbore. The pressure derivative curve in the first flow regime shows a straight-line characteristic with an upward inclination, and the pressure derivative curve in the second regime shows a V-shaped concavity, which reflects the secondary hydrate formation near the wellbore in the shut-off process. Since the pressure derivative does not fall off in the later stage, it is indicated that a pressure wave does not propagate to the outer boundaries during well testing.

Figure 8:
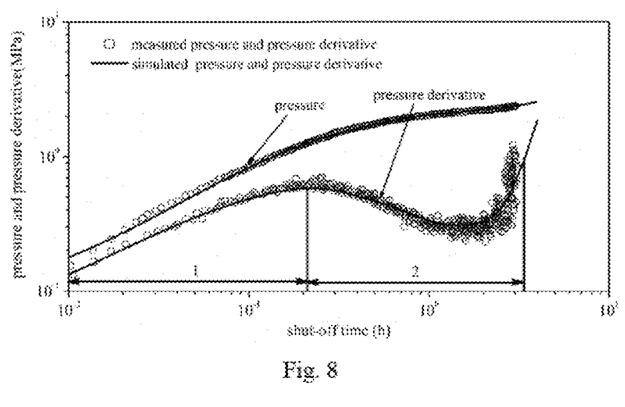
FIG. 8 shows curves showing a matching result of measured pressure data curves and theoretical curves according to an embodiment.

The measured pressure difference and pressure difference derivative curves are automatically matched with the theoretical pressure difference and pressure difference derivative curves by adjusting the relevant matching parameters. The final matching result is shown in FIG. 8. It can be seen from the figure that the matching result is ideal, the initial permeability is 1.2 mD, the permeability reduction exponent is 4.2, and the initial formation pressure is 11.5 MPa. These parameters play an important role in optimizing the exploitation scheme and predicting the production performance of the hydrate reservoir.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The above-mentioned embodiments are only used to illustrate the present disclosure, in which the structure and connection mode of each component can be changed. Any equivalent transformation and improvement based on the technical solution of the present disclosure should not be excluded from the protection scope of the present disclosure.

What is claimed is:

1. A method for obtaining formation parameters of a gas hydrate reservoir through well testing interpretation, comprising the following steps:
   (1) establishing a physical model for well testing interpretation of the gas hydrate reservoir according to characteristics of multiphase flow, hydrate dissociation, secondary hydrate formation and heat transfer exhibited in a well testing process of the gas hydrate reservoir;
   (2) establishing a mathematical model for well testing interpretation of the gas hydrate reservoir according to the physical model for well testing interpretation of the gas hydrate reservoir established in step (1);
   (3) conducting spatial discretization and temporal discretization on the mathematical model for well testing interpretation of the gas hydrate reservoir established in step (2), and adopting a finite volume method to solve the mathematical model, thus obtaining a numerical solution of bottom-hole pressure;
   (4) inputting relevant basic parameters to simulate a pressure buildup well testing process of the hydrate reservoir, calculating a bottom-hole pressure variation curve and a production rate variation curve in the well testing process according to the numerical solution obtained in step (3), and drawing theoretical curves of bottom-hole pressure difference and pressure difference derivative in a shut-off phase under a double logarithmic coordinate axis; and
   (5) by means of a particle swarm optimization algorithm, automatically matching measured curves of bottom-hole pressure difference and pressure difference derivative with the theoretical curves obtained in step (4), to finally obtain relevant formation parameters when a minimum value of an objective function is realized, the relevant formation parameters including a permeability of the gas hydrate reservoir, permeability reduction exponent, initial formation pressure and hydrate reservoir boundaries.

2. The method for obtaining the formation parameters of the gas hydrate reservoir through well testing interpretation according to claim 1, wherein the physical model for well testing interpretation of the gas hydrate reservoir in step (1)

comprises: the gas hydrate reservoir composed of a overburden layer, a hydrate layer and a underburden layer; the overburden layer and the underburden layer are composed of impermeable dry rock, and the hydrate layer is composed of dry rock, a water phase, a gas phase, a hydrate phase and an ice phase; a production well is located in center of the hydrate reservoir on a plane; perforations are located in the hydrate layer; assumption conditions of the physical model in step (1) at least comprise: influence of in-situ stress on the well testing process is ignored; flow in the gas phase and the water phase follows Darcy's law; heat conduction process follows Fourier's law; hydrate dissociation and secondary formation are kinetic reactions; influence of formation water salinity is ignored; and the pressure buildup well testing is adopted in the well testing process of step (1).

3. The method for obtaining the formation parameters of the gas hydrate reservoir through well testing interpretation according to claim 1, wherein the process for establishing the mathematical model for well testing interpretation of the gas hydrate reservoir in step (2) is as follows:

(1) the gas hydrate reservoir is a four-phase and three-component system, the four phases are water phase, gas phase, hydrate phase and ice phase, and the three components are methane, water and hydrate, wherein the methane component exists in the water phase and the gas phase, the water component exists in the water phase, the gas phase and the ice phase, and the hydrate component only exists in the hydrate phase; firstly, mass conservation equation of each component in a hydrate layer is determined, and mass conservation equation of a methane component is:

$$\frac{\partial}{\partial t}\left(\sum_{\beta=A,G} \phi S_\beta \rho_\beta X_\beta^m\right) + \nabla \cdot \left(\sum_{\beta=A,G} X_\beta^m \vec{v}_\beta\right) = \sum_{\beta=A,G} X_\beta^m q_\beta + \dot{n} M_m \quad (1)$$

wherein subscript $\beta$ represents phase, superscript m represents the methane component in the hydrate layer, $\phi$ is the porosity of the hydrate layer, $S_A$ and $S_G$ are the water phase saturation and the gas phase saturation in the hydrate layer respectively, $\rho_A$ and $\rho_G$ are the water phase density and the gas phase density respectively, $X_A^m$、$X_G^m$ are the mass fraction of the methane component in the water phase and the mass fraction of the methane component in the gas phase of the hydrate layer respectively, t is time, $\vec{v}_A$、$\vec{v}^G$ are the mass flow velocity of the water phase and the mass flow velocity of the gas phase in the hydrate layer respectively, $q_A$ and $q_G$ are the production rate of the water phase and the production rate of the gas phase in the production well respectively, $\dot{n}$ is hydrate dissociation/secondary formation rate, $M_m$ is the molar mass of methane;

a mass conservation equation of the water component is:

$$\frac{\partial}{\partial t}\left(\sum_{\beta=A,G,I} \phi S_\beta \rho_\beta X_\beta^w\right) + \nabla \cdot \left(\sum_{\beta=A,G} X_\beta^w \vec{v}_\beta\right) = \sum_{\beta=A,G} X_\beta^w q_\beta + n_H \dot{n} M_w \quad (2)$$

wherein superscript w represents the water component of the hydrate layer, $S_I$ is the ice phase saturation in the hydrate layer, $\rho_I$ is the ice phase density, $X_A^w$、$X_G^w$、$X_I^w$ are the mass fraction of the water component in the water phase, the mass fraction of the water component in the gas phase and the mass fraction of the water component in the ice phase of the hydrate layer respectively, $n_H$ is the hydration number, and $M_w$ is the molar mass of water;

a mass conservation equation of the hydrate component is:

$$\frac{\partial(\phi S_H \rho_H)}{\partial t} = -\dot{n} M_h \quad (3)$$

wherein h represents the hydrate component in the hydrate layer, $S_H$ is the hydrate phase saturation in the hydrate layer, $\rho_H$ is the hydrate phase density, and $M_h$ is the molar mass of hydrate;

mass flow velocities of the water phase and the gas phase $\vec{v}_A$ and $\vec{v}_G$ are calculated respectively by the following formulas:

$$\vec{v}_A = -k \frac{k_{rA} \rho_A}{\mu_A}(\nabla p_A - \rho_A \vec{g}) \quad (4)$$

$$\vec{v}_G = -k \frac{k_{rG} \rho_G}{\mu_G}(\nabla p_G - \rho_G \vec{g}) \quad (5)$$

wherein k is the permeability of the hydrate layer, $k_{rA}$ and $k_{rG}$ are the relative permeability of the water phase and the relative permeability of the gas phase in the hydrate layer respectively, $\mu_A$ and $\mu_G$ are the viscosity of the water phase and the viscosity of the gas phase respectively, $p_A$ and $p_G$ are the water phase pressure and the gas phase pressure in the hydrate layer respectively, and $\vec{g}$ is the gravitational acceleration;

a calculation formula of the porosity of the hydrate layer varying with the hydrate saturation is as follows:

$$\phi = \phi_0(1-S_H) \quad (6)$$

wherein $\phi_0$ is the initial porosity when there is no hydrate at all in the hydrate layer;

a calculation formula of the permeability of the hydrate layer varying with the porosity is as follows:

$$k = k_0\left(\frac{\phi}{\phi_0}\right)^\varepsilon \left(\frac{1-\phi_0}{1-\phi}\right)^2 \quad (7)$$

wherein $k_0$ is the absolute permeability when there is no hydrate at all in the hydrate layer, and $\varepsilon$ is the permeability reduction exponent;

a calculation formula of the hydrate dissociation/secondary formation rate $\dot{n}$ is:

$$\dot{n} = K_d \exp\left(-\frac{\Delta E_a}{RT}\right) A_{HS}[f_{eq} - f_G] \quad (8)$$

wherein $K_d$ is the inherent reaction rate constant of hydrate, $\Delta E_a$ is activation energy, R is the universal gas constant, T is the temperature of the hydrate layer, $A_{HS}$ is the reaction surface area of hydrate particles in unit volume porous medium, $f_{eq}$ is the corresponding fugacity under the hydrate phase equilibrium condition, and $f_G$ is the corresponding gas phase fugacity under the current condition;

(2) taking into account a heat conduction in the overburden layer, the underburden layer and the hydrate layer, heat convection caused by gas phase and water phase flow in the hydrate layer and an influence of hydrate chemical reaction heat in the hydrate layer during the well testing of the gas hydrate reservoir, an energy conservation equation is determined as follows:

$$\frac{\partial}{\partial t}\left[(1-\phi)\rho_R U_R + \sum_{\beta=A,G,H,I}(\phi S_\beta \rho_\beta U_\beta)\right] - \nabla \cdot (\lambda_{\textit{eff}} \nabla T) + \quad (9)$$
$$\nabla \cdot \left(\sum_{\beta=A,G} H_\beta \vec{v}_\beta\right) = \left(\sum_{\beta=A,G} H_\beta q_\beta\right) + \dot{n}\Delta H_H^0 + \tilde{q}_{in}$$

wherein $U_R$、$U_A$、$U_G$、$U_H$、$U_I$ are the specific internal energy of the dry rock, the specific internal energy of the water phase, the specific internal energy of the gas phase, the specific internal energy of the hydrate phase and the specific internal energy of the ice phase respectively, $\rho_R$ is the density of the dry rock, $C_R$ is the specific heat capacity of the dry rock, $\lambda_{\textit{eff}}$ is the composite heat conductivity of the hydrate layer, $\lambda_{\textit{eff}}=\phi(\lambda_A S_A + \lambda_G S_G) + (1-\phi_0)\lambda_R + (\phi_0-\phi)(S_H \lambda_H + S_I \lambda_I)$, $\lambda_A$, $\lambda_G$, $\lambda_H$ and $\lambda_I$ are the heat conductivity of the water phase, the heat conductivity of the gas phase, the heat conductivity of the hydrate phase and the heat conductivity of the ice phase in the hydrate layer respectively, $\lambda_R$ is the heat conductivity of the dry rock, $H_A$、$H_G$ are the specific enthalpy of the water phase and the specific enthalpy of the gas phase in the hydrate layer respectively, $\Delta H_H^0$ is the chemical reaction heat of hydrate dissociation/secondary formation, and $\tilde{q}_m$ is for unit time, the heat transfer amount per unit area passing through an interface between the overburden layer and the hydrate layer and an interface between the underburden layer and the hydrate layer;

(3) an initial condition, an inner boundary condition and an outer boundary condition of the gas hydrate reservoir are determined, wherein the initial condition is:

$p(r,t=0)=p_0$ $T(r,t=0)=T_0$ $S_H(r,t=0)=S_{H0}$ $S_A(r,t=0)=S_{A0}$ (14)

wherein p is the pressure of the hydrate layer, r is the coordinate along the radial direction, $p_0$ is the initial formation pressure of the hydrate layer, $T_0$ is the initial formation temperature of the hydrate layer, and $S_{H0}$ and $S_{A0}$ are the initial hydrate phase saturation in the hydrate layer and the initial water phase saturation in the hydrate layer respectively;

according to the pressure buildup well testing process, an internal boundary condition can be determined as follows:

$p|_{r_w,t\leq t_p} = p_{wf}$ (15)

$q|_{r_w,t>t_p} = 0$ wherein $r_w$ is the wellbore radius of the production well, $p_{wf}$ is the bottom-hole pressure of the production well, $t_p$ is the production time before shut-off of the production well, and q is the sum of the total production rate of the gas phase and the water phase in the production well;

the outer boundary is a closed boundary, and the outer boundary condition can be determined as follows:

$$\frac{\partial p}{\partial r}\bigg|_{r=r_e,t} = \frac{\partial T}{\partial r}\bigg|_{r=r_e,t} = 0 \quad (16)$$

wherein $r_e$ is the radius of the gas hydrate reservoir.

4. The method for obtaining the formation parameters of the gas hydrate reservoir through well testing interpretation according to claim 1, wherein the process for numerical solution of the mathematical model in step (3) is as follows:

(1) grid division is carried out on a gas hydrate reservoir in space, and discretization is carried out by backward difference in time;

(2) discretization is carried out on the mathematical model by adopting a finite volume method, wherein for any discrete grid unit i, a mass conservation equation of a methane component after discretization is as follows:

$$\left(\sum_{\beta=A,G}\phi S_\beta \rho_\beta X_\beta^m\right)_i^{n+1} - \left(\sum_{\beta=A,G}\phi S_\beta \rho_\beta X_\beta^m\right)_i^n - \quad (17)$$
$$\frac{\Delta t}{V_i}\sum_j A_{ij}\left(\sum_{\beta=A,G} X_\beta^m \vec{v}_\beta\right)_{ij}^{n+1} - \Delta t\left(\sum_{\beta=A,G} X_\beta^m q_\beta + \dot{n}M_m\right)_i^{n+1} = 0$$

wherein i and j represent the i-th and j-th discrete unit grids, n represents the n-th iteration time step, $\Delta t$ is the iteration time step, $V_i$ is the volume of the i-th discrete unit grid, and $A_{ij}$ is the area of an interface between the i-th and j-th discrete unit grids;

for any discrete grid unit i, a mass conservation equation of a water component after discretization is:

$$\left(\sum_{\beta=A,G,I}\phi S_\beta \rho_\beta X_\beta^w\right)_i^{n+1} - \left(\sum_{\beta=A,G,I}\phi S_\beta \rho_\beta X_\beta^w\right)_i^n - \quad (18)$$
$$\frac{\Delta t}{V_i}\sum_j A_{ij}\left(\sum_{\beta=A,G} X_\beta^w \vec{v}_\beta\right)_{ij}^{n+1} - \Delta t\left(\sum_{\beta=A,G} X_\beta^w q_\beta + n_H \dot{n} M_w\right)_i^{n+1} = 0$$

for any discrete grid unit i, a mass conservation equation of a hydrate component after discretization is:

$(\phi S_H \rho_H)_i^{n+1} - (\phi S_H \rho_H)_i^n + \Delta t M_h \dot{n}_i^{n+1} = 0$ (19)

for any discrete grid unit i, an energy conservation equation after discretization is:

$$\left[(1-\phi)\rho_R U_R + \sum_{\beta=A,G,H,G,I}(\phi S_\beta \rho_\beta U_\beta)\right]_i^{n+1} - \quad (20)$$
$$\left[(1-\phi)\rho_R U_R + \sum_{\beta=A,G,H,G,I}(\phi S_\beta \rho_\beta U_\beta)\right]_i^n -$$
$$\frac{\Delta t}{V_i}\sum_j A_{ij}\left(\sum_{\beta=A,G} H_\beta \vec{v}_\beta - \lambda_{\textit{eff}} \nabla T\right)_{ij}^{n+1} -$$
$$\Delta t\left(\sum_{\beta=A,G} H_\beta q_\beta + \dot{n}\Delta H_H^0\right)_i^{n+1} = 0$$

for any discrete grid unit i, an initial condition after discretization is:

$$p_i^{n+1} = p_0$$

$$T_i^{n+1} = T_0$$

$$(S_H)_i^{n+1} = S_{H0}$$

$$(S_A)_i^{n+1} = S_{A0} \qquad (21)$$

an internal boundary condition after discretization is:

$$p_{wb}^{n+1}|_{t \le t_p} = p_{wf} \qquad (22)$$

$$\frac{2\pi \Delta z}{\ln(r_{ew}/r_w) - 1/2} \left[ \left( \frac{kk_{rG}\rho_G}{\mu_G} + \frac{kk_{rA}\rho_A}{\mu_A} \right)(p_{wb} - p_{wf}) \right]_{wb}^{n+1} \bigg|_{t > t_p} = 0$$

wherein subscript wb represents a wellbore, $r_{ew}$ is the equivalent radius of the grid where the well is located, $p_{wb}$ is the pressure of the grid where the well is located, and $\Delta z$ is the thickness of the grid where the well is located;

a default boundary of the finite volume method is a closed boundary, so it is not necessary to solve an external boundary discretely;

(3) a matrix is constructed according to a nonlinear equation set consisting of the equations (17)-(22), and an iterative solution of the mathematical model is realized by using a conjugate gradient method, thus obtaining the numerical solution of the bottom-hole pressure during well testing of the gas hydrate reservoir.

5. The method for obtaining the formation parameters of the gas hydrate reservoir through well testing interpretation according to claim 1, wherein in the theoretical curve of step (4), the calculation formula of the bottom-hole pressure difference is:

$$\Delta p(t_p + \Delta t) = p_{wf}(t_p + \Delta t) - p_{wf}(t_p) \qquad (23)$$

wherein $\Delta p(t_p + \Delta t)$ is the bottom-hole pressure difference at time $t_p + \Delta t$, $P_{wf}(t_p + \Delta t)$ is the bottom-hole pressure of the production well at time $t_p + \Delta t$, $P_{wf}(t_p)$ is the bottom-hole pressure of the production well at time $t_p$;

in the theoretical curve of step (4), the calculation method of the bottom-hole pressure difference derivative is as follows:

$$\Delta p'_l = \left(\frac{d\Delta p}{dX}\right)_l = \left[\left(\frac{\Delta p_1}{\Delta X_1}\right)\Delta X_2 + \left(\frac{\Delta p_2}{\Delta X_2}\right)\Delta X_1\right](\Delta X_1 + \Delta X_2) \qquad (24)$$

wherein subscript l represents any l-th time node in the shut-off phase, subscript 1 represents the time node before the l-th time node, and subscript 2 represents the time node after the l-th time node, $\Delta p'_l$ is the derivative of bottom-hole pressure difference at the l-th time, $d\Delta p$ is the differentiation of $\Delta p$, dX is the differentiation of X, $\Delta X_1$ and $\Delta X_2$ represent the variation of X at time 1 and time 2 respectively, $\Delta p_1$ and $\Delta p_2$ represent the bottom-hole pressure difference at time 1 and time 2 respectively;

in step (4), a production rate data in a production phase is artificially divided into n stages, and an expression of X is:

$$X = \frac{1}{q_n - q_{n-1}} \left[ \sum_{l=1}^{n-1} (q_l - q_{l-1}) \ln \sum_{s=l}^{n-1} (\Delta t_s + \Delta t) \right] + \ln(\Delta t) \qquad (25)$$

wherein subscript s represents any s-th time node in the shut-off phase.

6. The method for obtaining the formation parameters of the gas hydrate reservoir through well testing interpretation according to claim 1, wherein in the automatic matching process in step (5), the calculation formula of an objective function value is:

$$G(\vec{x}) = \sum_{l=1}^{N} [\Delta p(t_p + \Delta t_l, \vec{x}) - \Delta p(t_p + \Delta t_l)]^2 + \qquad (26)$$

$$\sum_{l=1}^{N} [\Delta p'(t_p + \Delta t_l, \vec{x}) - \Delta p'(t_p + \Delta t_l)]^2$$

wherein $G(\vec{x})$ is the least square value, $\vec{x}$ is the relevant search variable, $\Delta p(t_p+\Delta t_l, \vec{x})$, and $\Delta p(t_p+\Delta t_l)$ represent the bottom-hole pressure difference value of the theoretical curve and the bottom-hole pressure difference value of the measured curve when searching along the direction $\vec{x}$ at time $t_p+\Delta t_l$ respectively, $\Delta p'(t_p+\Delta t_l, \vec{x})$, and $\Delta p'(t_p+\Delta t_l)$ represent the bottom-hole pressure difference derivative value of the theoretical curve and bottom-hole pressure difference derivative value of the measured curve when searching along the direction $\vec{x}$ at time $t_p+\Delta t_l$ respectively, and N represents the total number of discrete time points on the curve;

the particle swarm optimization algorithm is adopted to search in a definition domain $(\vec{x}_{min}, \vec{x}_{max})$ of search variables, and the theoretical pressure difference and pressure difference derivative curves are calculated by changing relevant matching parameters, including the permeability of the gas hydrate reservoir, permeability reduction exponent, initial formation pressure and hydrate reservoir boundaries, so that the objective function value is minimized, and finally obtained matching parameters are the formation parameters obtained through well testing interpretation.

* * * * *